Patented Feb. 8, 1938

2,107,277

UNITED STATES PATENT OFFICE 2,107,277

TANTALUM RECOVERY

Miner M. Austin, Highland Park, Ill., assignor to Fansteel Metallurgical Corporation, a corporation of New York No Drawing. Application April 14, 1932, Serial No. 605,358. Renewed December 19, 1934

12 Claims. (Cl. 75—84)

This invention relates in general to the recovery of metals from scrap, and has more particular reference to the recovery of metals of the group including tantalum and columbium.

Among the objects of the invention are the provision of an improved method of recovering a good, workable grade of substantially pure tantalum or columbium from scrap, which has heretofore been wasted, whereby to provide a relatively inexpensive source of such metals; whereby tantalum or columbium powder of at least commercial purity may be recovered and saved from waste or scrap, whereby the size or mesh of tantalum or columbium powder produced from the scrap of such metals by my novel method may be controlled in accordance with the size or mesh of the powder required for subsequent use of tantalum or columbium so produced; and whereby in general to effect a material saving in the metallurgy of tantalum and columbium by this novel reclamation process.

Other objects and advantages of the invention will appear more fully from the following description.

In order to accomplish the foregoing objects, I introduce clean scrap of tantalum or columbium in pieces of any size in a suitable vessel and so heat the scrap in the presence of an embrittling gas, for example hydrogen, as to promote the rapid absorption of hydrogen by the scrap. Rapid absorption of the hydrogen is promoted by heating the scrap in hydrogen at or above atmospheric pressure, for example, from five pounds per square inch to fifty pounds per square inch pressure to from 600° to 700° C. The scrap is then slowly cooled or permitted to cool over a period of from one to two hours, until the temperature reaches about 500° C. It is permitted to cool further over a period of say three to ten hours until the temperature has dropped to about 100° C.

In this manner hydrogen is rapidly absorbed in large quantities by the scrap, the larger proportion of hydrogen being absorbed during the very slow cooling from 500° C. down to 100° C. The rate of absorption of hydrogen between 500° C. and 100° C. is ordinarily relatively slow, but by starting the absorption of the hydrogen at the higher temperature of from 600° C. to 750° C., I have succeeded in increasing the rate of absorption at the lower temperatures.

When tantalum or columbium scrap is so treated with hydrogen, it is very brittle and friable and may easily be broken or pounded to a powder. I take advantage of this brittleness by grinding the embrittled scrap preferably in a hammer mill to say from 100 to 200 mesh powder. Of course, the invention contemplates grinding the embrittled scrap in a burr mill and removing the impurities introduced in the mill by subsequently washing the powder in a suitable acid.

The hydrogenated powder is next slowly heated to about 900° C. while the hydrogen is removed by a vacuum pump. This heating and pumping is continued until a vacuum of from 100 to 30 microns is obtained, the time required for such vacuum depending, of course, upon the size and arrangement of the equipment.

When degasified as described above, the tantalum or columbium powder is not susceptible to caking or forming larger pieces of the metal. The size of the final powder may, therefore, be controlled or determined by the size or mesh to which the hydrogenated powder is ground. This hydrogenated ground and dehydrogenated powder may then be used in any desired manner for combining with other materials or may be pressed to a desired form and sintered to produce tantalum or columbium articles of manufacture.

In the production of metals from the group including tantalum and columbium, one of the final steps usually is that of sintering in order to complete the degasification of the metal and to effect a solidification of the metal particles. Tantalum or columbium scrap is therefore substantially free from embrittling gases. Due to this fact the powder resulting from my dehydrogenation step very nearly approaches in purity that of the original material, and may even result in tantalum or columbium having or including less hydrogen than commercial tantalum or columbium.

The recovered or reclaimed tantalum and columbium resulting from my novel method as described above, has all of the properties of commercial tantalum and columbium and may be readily worked. It is strong, ductile, and as hard as the commercial product.

While I have described a preferred embodiment of my invention, many modifications may be made without departing from the spirit of the invention. For example, in the hydrogenation of the scrap, the pressure of the hydrogen may vary from one to two hundred pounds per square inch; the degasification temperature of the hydrogenated ground powder may vary between 600° C. and 1200° C.; and the heating and pumping during the dehydrogenation may continue until a vacuum of up to one thousand microns is obtained, the important conception being the heating of the scrap in an atmosphere of an embrittling gas, such as hydrogen, at descending temperatures, and dehydrogenating the scrap by heating it to a temperature at which the hydrogen absorbed, dissolved, or occluded by the scrap is substantially reduced.

I do not wish, therefore, to be limited to the precise details set forth above, but desire to avail myself of all changes within the scope of the appended claims.

Having thus described my invention, what I claim as new and desire to secure by Letters Patent of the United States, is:

1. A method of recovering commercial tantalum from tantalum scrap, which comprises hydrogenating tantalum scrap, grinding the hydrogenated scrap and heating the hydrogenated powder to substantially 900° C. while exhausting the gases released from the powder by the heat.

2. A method of recovering tantalum from tantalum metal scrap which comprises heating tantalum metal scrap in an atmosphere of hydrogen to from 600° to 750° C., slowly cooling the scrap in the presence of hydrogen until the temperature thereof reaches about 100° C. whereby said metal scrap is hydrogenated, and heating the hydrogenated scrap in vacuo to substantially 900° C. while maintaining the vacuum.

3. In the recovery of metal from the group including tantalum and columbium from solid scrap, the method of hydrogenating the solid scrap preparatory to the purification thereof which comprises heating the scrap in hydrogen at from five to fifty pounds per square inch pressure, to from 600 to 750° C. whereby to increase the normal hydrogen absorption rate of said scrap at lower temperatures, slowly cooling the scrap to substantially 500° C. and thereafter very slowly cooling the scrap to substantially 100° C.

4. A method of reclaiming a metal from the group including tantalum and columbium from the scrap thereof, which comprises heating the scrap in an atmosphere of hydrogen at from five to fifty pounds per square inch pressure, grinding the hydrogenated scrap and heating the ground scrap while maintaining it in a vacuum.

5. A method of reclaiming tantalum from solid tantalum scrap which comprises heating hydrogenated scrap powder to a temperature of 900° C., the while exhausting the liberated gases until a vacuum of from 100 to 30 microns is obtained.

6. A method of reclaiming tantalum from tantalum scrap which comprises degasifying hydrogenated scrap powder by heating it to about 900° C. and simultaneously exhausting the gases liberated by such heating, and continuing the foregoing operation until a vacuum of from 100 to 30 microns is obtained.

7. A method of reclaiming a metal of a group including tantalum and columbium from scrap, which comprises hydrogenating the scrap, pulverizing the hydrogenated scrap, and simultaneously dehydrogenating the scrap and exhausting the gases liberated by the scrap by means of heat in a vacuum of from 100 to 30 microns.

8. A method of reclaiming a metal of the group including tantalum and columbium from the solid scrap thereof, which comprises partially hydrogenating the scrap by heating it in the presence of hydrogen at from 600° to 750° C., whereby to increase the normal hydrogen absorption rate of said scrap at lower temperatures, decreasing the temperature of the scrap in the presence of the hydrogen to about 500° C. and thereafter to about 100° C., whereby to complete the hydrogenation of said scrap, grinding the hydrogenated scrap, and heating the ground hydrogenated scrap in a vacuum.

9. A method of reclaiming a metal of the group including tantalum and columbium from the solid scrap thereof, which comprises partially hydrogenating the scrap by heating it in the presence of hydrogen at from 600° to 750° C., whereby to increase the normal hydrogen absorption rate of said scrap at lower temperatures, completing the hydrogenation of said scrap at lower temperatures, grinding the hydrogenated scrap and heating the ground hydrogenated scrap in a vacuum.

10. A method of recovering a metal of the group including tantalum and columbium from the scrap thereof, which comprises hydrogenating the scrap, pulverizing the hydrogenated scrap, and dehydrogenating the pulverulent scrap.

11. A metallurgical method, which comprises embrittling metallic pieces containing tantalum by heating them in an atmosphere of hydrogen to a temperature at which said pieces become partially impregnated with the hydrogen and susceptible to further impregnation by the hydrogen at lower temperatures, and decreasing the temperature of said metallic pieces in the presence of hydrogen whereby to complete the impregnation of the metallic pieces; pulverizing the impregnated metallic pieces; and degasifying the pulverulent mass by heating it in a vacuum whereby to purify the tantalum contained therein.

12. A metallurgical method, which comprises embrittling metallic pieces of metal of the group including tantalum and columbium by heating such pieces in an atmosphere of hydrogen to a temperature at which said pieces become partially gasified and susceptible to further gasification at lower temperatures, and decreasing the temperatures of said metallic pieces in the presence of hydrogen whereby to complete the gasification of the metallic pieces; pulverizing the gasified metallic pieces; and degasifying the pulverulent mass by heating it in a vacuum.

MINER M. AUSTIN.